(12) United States Patent
Hettich et al.

(10) Patent No.: US 12,153,970 B2
(45) Date of Patent: Nov. 26, 2024

(54) PROCESS SEQUENCING USING META DOMAIN MODEL

(71) Applicant: SAP SE, Walldorf (DE)

(72) Inventors: Michael Hettich, Heidelberg (DE); Andre Klahre, Angelbachtal (DE); Alexander Koenig, Heidelberg (DE)

(73) Assignee: SAP SE, Walldorf (DE)

( * ) Notice: Subject to any disclaimer, the term of this patent is extended or adjusted under 35 U.S.C. 154(b) by 316 days.

(21) Appl. No.: 17/939,283

(22) Filed: Sep. 7, 2022

(65) Prior Publication Data
US 2024/0078144 A1   Mar. 7, 2024

(51) Int. Cl.
*G06F 9/54*   (2006.01)
*G06F 9/445*   (2018.01)

(52) U.S. Cl.
CPC .......... *G06F 9/542* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 2012/0167056 A1* | 6/2012 | Brunswig | G06F 11/362 717/129 |
| 2018/0204149 A1* | 7/2018 | Cortes Cornax | G06F 8/34 |

\* cited by examiner

*Primary Examiner* — Craig C Dorais
(74) *Attorney, Agent, or Firm* — Buckley, Maschoff & Talwalkar LLC

(57) ABSTRACT

Systems and methods include reception of an indication of a first event associated with a first object instance. In response to the indication of the first event, a first process chain comprising a first process associated with an object instance of a first meta domain model object type, a second process associated with an object instance of a second meta domain model object type, and a first process step adapter to map a response to a request are determined, the first process is executed based on a request associated with an object instance of the first meta domain model object type to generate a first response associated with an object instance of the first meta domain model object type, the first process step adapter is executed to map the first response associated with an object instance of the first meta domain model object type to a first request associated with an object instance of the second meta domain model object type, and the second process is executed based on the first request associated with an object instance of the second meta domain model object type to generate a second response associated with an object instance of the second meta domain model object type.

20 Claims, 10 Drawing Sheets

PROCESS SEQUENCING USING META DOMAIN MODEL

BACKGROUND

Modern system landscapes consist of independent applications provided by several computing systems. It is often desirable for two applications within a system landscape to communicate with one another. However, and especially if the two applications are provided by different application vendors, differences in the structure and content of their logical entities (e.g., database objects) may render such communication difficult.

To address the foregoing, abstractions may be defined which represent application-agnostic representations of logical entities. To communicate with a second application, a first application may convert an object instance from its application-specific structure to a structure defined by such an abstraction, or "meta domain model". The second application receives the converted instance, converts the instance of the meta domain model to one or more application-specific object instances, and processes the application-specific object instances.

In a specific example, product data is regularly sent between different Product Lifecycle Management (PLM) systems during different phases of product development. Product data is represented in a PLM system by different objects such as a material object and a Bill of Materials (BOM) object. Meta domain model objects therefore provide generic representations of a material object and a BOM object, which are used as described above for communication between systems whose material and BOM objects differ from one another.

In a case that an object instance (e.g., a product) is changed in one application, it may be desirable to change one or more corresponding object instances in a separate application. This change requires an external service call to the separate application and could include multiple service calls which depend on each other. For example, a change to a product in a first application may require reading engineering change master records in first application, mapping the fetched data to a meta data model change object, creating a change object in a second application, and maintaining a document in the second application.

Systems are desired to facilitate the definition and execution of multiple processes per event trigger, where the processes may include one or more external service calls.

DETAILED DESCRIPTION

The following description is provided to enable any person in the art to make and use the described embodiments. Various modifications, however, will be readily-apparent to those in the art.

According to some embodiments, a process chain includes multiple different and dependent processes to be executed in a defined sequence. The input to each process in a process chain is a request in the format of a specific meta domain model object type, and the output of each process is a response in the format of a specific meta domain model object type. Chaining of processes is accomplished by mapping the response format output by a process to a request format of a subsequent process in the chain.

For example, a process chain which maintains a product version in an external application system may include two processes. The first process reads a product version in a first (i.e., internal) system and the second process calls an outbound service to maintain a product version in the external system. After the product version is read by the first process, the response structure output by the first process is mapped to the request structure of the second process. The mapping is performed by meta domain model object-specific adapter implementations.

Embodiments provide a structured mechanism to trigger and handle multiple inter and intra-application integration activities based on one event. Embodiments also facilitate the reusability of processes in different process chains. For example, the first process of the preceding paragraph may also be used in a process chain which is executed in response to an inbound request to read a product version.

Some embodiments facilitate incorporation of new meta domain model objects by seamlessly supporting new key mappings and new process chain adapters. Embodiments may be used with synchronous and asynchronous processing and for inbound and outbound communications. Embodiments may be implemented independent of programming language and/or integration technology.

Figure 1:
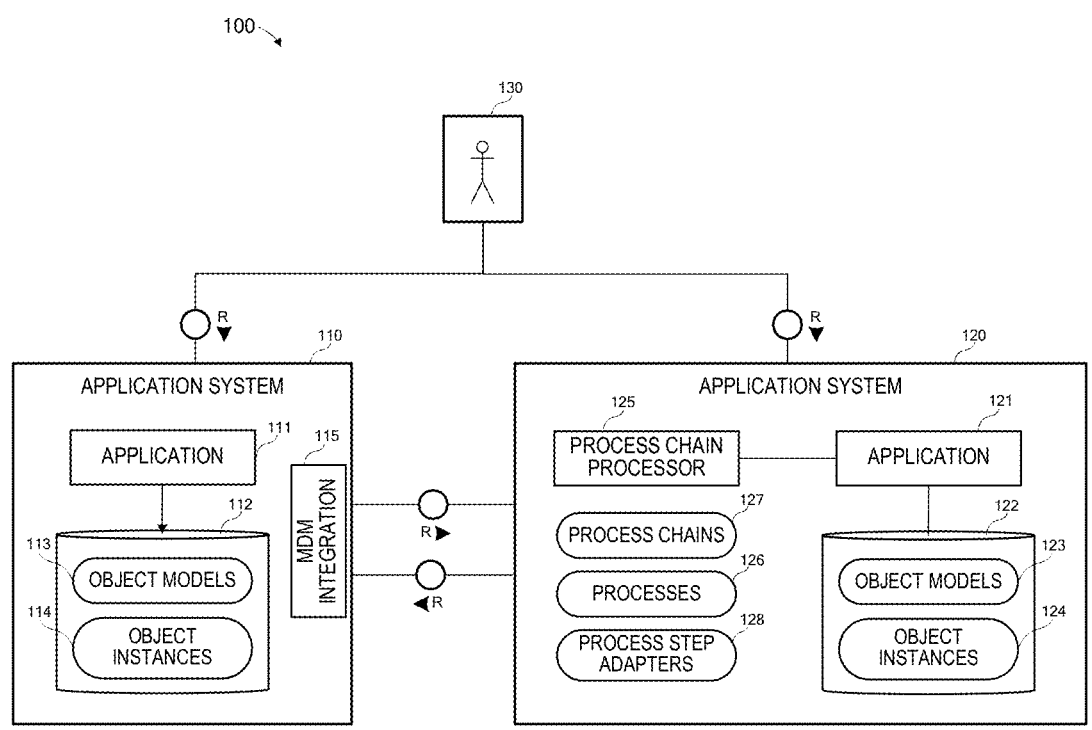
FIG. 1 is a block diagram of an architecture to facilitate chaining of intra and inter-application calls based on event triggers according to some embodiments.

FIG. 1 is a block diagram of architecture 100 according to some embodiments. The illustrated elements of architecture 100 and of all other architectures depicted herein may be implemented using any suitable combination of computing hardware and/or software that is or becomes known. Such combinations may include one or more processing units (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Each of application systems 120, 130 and any other system mentioned herein may comprise an on-premise server, a cloud-deployed virtual machine, or any other suitable computing system to provide a software-based application/service to users. Any components of application systems 120, 130 may be implemented in a distributed manner. For example, application system 120 may include a plurality of compute nodes (e.g., servers) and a plurality of database nodes.

While each of application systems 120, 130 may execute more than one application/service, application system 110 is depicted as including application 111 and application system 120 is depicted as including application 121. Application system 110 executes program code of application 111 to provide functionality based on data stored in storage 112. Storage 112 may comprise one or more volatile and/or non-volatile data storage devices. Similarly, application system 120 executes program code of application 121 to provide functionality based on data stored in storage 122, which may comprise one or more volatile and/or non-volatile data storage devices.

Storage 112 includes metadata defining object models 113 as is known in the art. An object model 113 may specify data and logic used to represent a logical entity. Object instances 114 include the data of particular instances of the logical entities. For example, object models 113 may include an object model defining a product object, while object instances 114 may include several instances of the product object, each of which corresponds to a particular product. The logical entities of object models 113 are typically related to the functionality of the application which is intended to access object instances 114.

Storage 122 includes object models 123 and corresponding object instances 124. One or more (and possibly all) of object models 123 may differ from object models 113. A logical entity (e.g., product) represented by an object model 123 may be the same as a logical entity represented by an object model 112, even though the metadata of the object models differ (e.g., specify different data and/or a different data structure).

User 130 transmits requests to application systems 110 and 120. For example, user 130 may operate a computing device to execute a Web browser and to input a Uniform Resource Locator (URL) associated with a domain of systems 110 or 120. The Web Browser issues a request based on the URL and receives a Web page or a browser-executable client application as is known in the art to facilitate communication with application 111 or 121.

Application 111 and application 121 may provide related functionality, some of which may overlap. For example, application 111 and application 121 may comprise PLM applications provided by different software vendors, but embodiments are not limited thereto. Accordingly, as described above, it may be desirable to change object instances 114, 124 stored by one of applications 111, 121 based on changes to object instances 114, 124 executed by the other one of applications 111, 121.

Application system 120 includes process chain processor 125. Process chain processor 125 executes processes 126 and process step adapters 128 as described herein. Each of processes 126 comprises program code executable to operate on instances of a particular meta domain model object. For example, each process 126 is executable to receive a request structure of an instance of a particular meta data model object, perform one or more tasks thereon, and output a response structure of an instance of the particular meta data model object. Each process step adapter 128 comprises program code executable to map a response structure of a given meta data model object instance to a request structure of another meta data model object instance.

Process chains 127 may comprise stored metadata in which each process chain 127 is associated with one or more processes 126 and one or more process step adapters 128. Advantageously, a process 126 and a process step adapter 128 may be associated more than one process chain 127. The metadata also associates one or more events and/or inbound calls with a process chain 127 which is to be executed by process chain processor 125 in response to such an event or inbound call. The metadata may be created by an administrator, who defines a process chain 127 as a sequence of processes 126 and intermediate process step adapters 128. The administrator may also associate the process chain 127 with a triggering event defined by a request type (e.g., read, create, update) and object type.

The process step adapters 128 of a process chain 127 are selected to map the response structures of each process 126 of the process chain 127 to the request structures expected by a next process 126 of the process chain 127. In a first process chain 127, the output of a particular process 126 may be mapped to a request structure of a first meta data model object instance by a first process step adapter 128. However, in a second process chain 127, the output of the particular process 126 may be mapped to a request structure of a second meta data model object instance by a second process step adapter 128.

Figure 2:
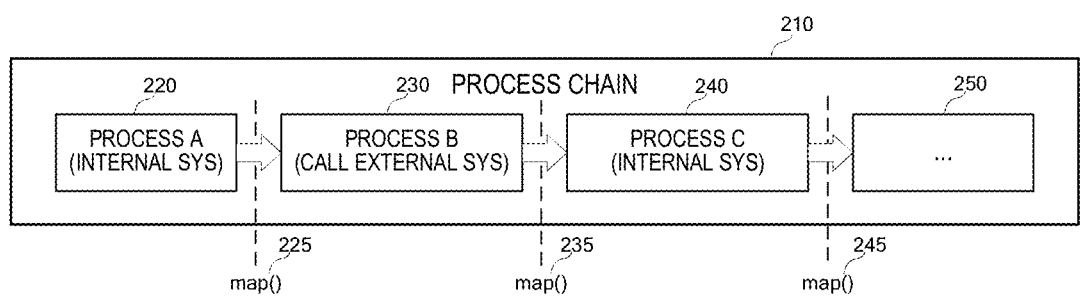
FIG. 2 illustrates a process chain comprising processes and process step adapters according to some embodiments.

FIG. 2 illustrates process chain 210 comprising processes 220, 230, 240 and 250 and process step adapters 225, 235 and 245 according to some embodiments. Process step adapter 225 maps the response structure of the meta data model object instance output by process 220 to a request structure of a meta data model object instance expected by process 230. For example, a process step adapter may map a response of a meta domain model change object to a request meta domain model document version.

Process chain 210 may be associated with a request type and object type of a triggering event as described above. The triggering event may comprise the reception of data from an external application (i.e., an inbound process chain), or the determination of a change to a particular type of internal object instance (i.e., an outbound process chain). FIG. 2 assumes that a request object instance is input to chain 210 as a meta domain model object instance. For an outbound process chain, a corresponding internal object instance (e.g., a changed product) is converted to a meta data model object prior to triggering the chain. For an inbound process chain, the object instance received from the external application is converted to a meta data model object before being processed by the successive processes of the process chain.

As shown, the processes of a process chain may include calls to external systems or internal systems. Calls to an internal system may utilize APIs exposed by the internal system. Calls to an external system comprise requests of a meta data model object, therefore it is assumed that the external system is configured to interpret such requests, as described above with respect to MDM integration component 116 of system 110.

Figure 3:
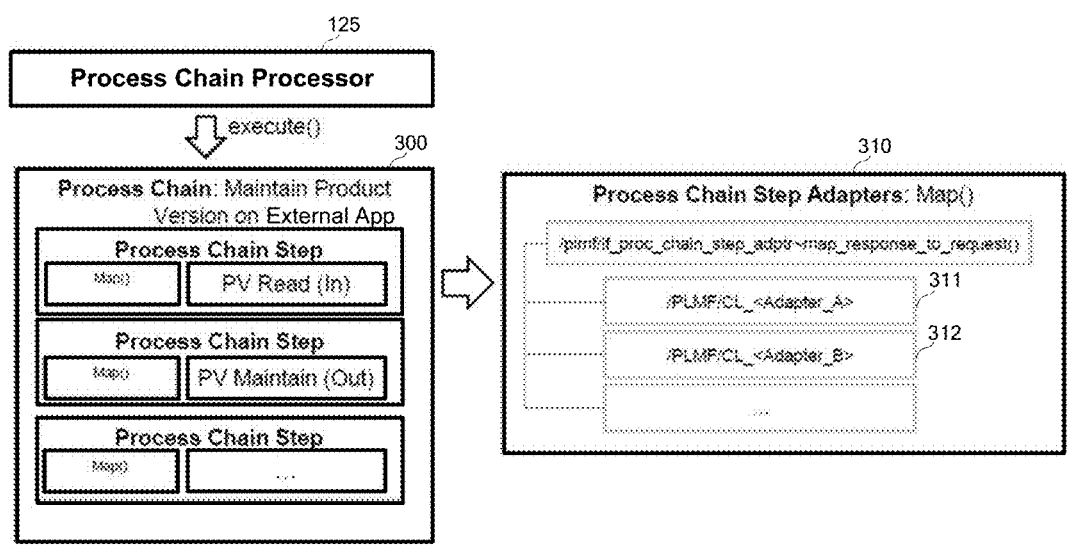
FIG. 3 is a block diagram illustrating a process chain including process chain step adapters according to some embodiments.

FIG. 3 is a block diagram further illustrating process chain, processes and process step adapters according to some embodiments. Process chain processor 125 initiates execution of process chain 300 in response to an event which is mapped to process chain 300. Process chain processor 125 executes a list of defined processes of a process chain, executes appropriate process step adapters at appropriate times to map response structures to request structures, creates processes, performs status handling and logging and persists process states and process results.

Process chain 300 includes three process chain steps, each of which comprises a process (e.g., Product Version read (Inbound), Product Version maintain (Outbound)) and a corresponding process chain adapter. The process chain adapter of a process chain step maps a response to a request which is compatible with the process of the process chain step. Accordingly, the process step adapter of a process chain step is selected based on the meta domain model object of its companion process in the process chain step and on the meta domain model object output by the immediately-prior process in the process chain. Process chain adapters 310 include process chain adapters 311, 312 which may be associated with a process chain step and executed by process chain processor.

Figure 4:
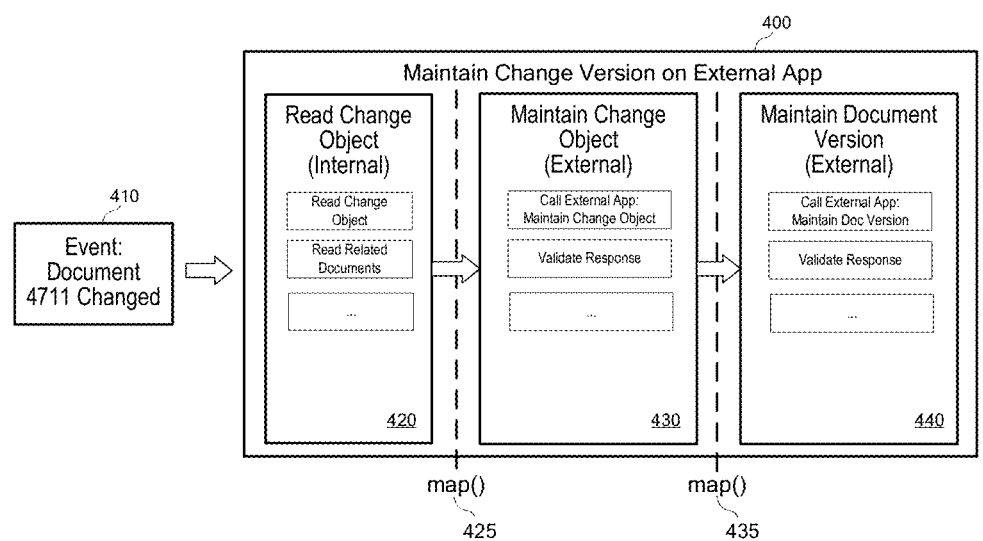
FIG. 4 is a block diagram illustrating an example process chain according to some embodiments.

FIG. 4 is an example of process chain 400 according to some embodiments. It will be assumed that process chain 400 is associated with a change to an internal document object instance and is therefore executed by a process chain processor in response to such a change. Process chain 400 is intended to maintain a change version on an external application system.

Event 410 is raised by the internal application (e.g., application 121) due to a change made to a document object instance. The change may have resulted from normal operation of the internal application, for example in response to input received by application 121 from user 130. Application 121 is therefore configured to provide events to process chain processor 125 to enable process chain processor 125 to determine whether a process chain is associated with the event and should therefore be executed.

Initially, based on a key of the internal application corresponding to the document object instance and on a key mapping table, a corresponding meta domain model object and its keys are determined. Read change object process 420 is then executed, which includes several constituent tasks illustrated in FIG. 4. These tasks include a read change object task which selects all associated and linked entities to build the corresponding meta domain model object, and a read related documents task to determine the related documents which are linked to the object.

Maintain change object process 430 is executed to call the external application using the object instance built by process 420. The object instance built by process 420 conforms to a response structure and is therefore mapped to a request structure by process step adapter 425 prior to process 430. A maintain change object service of the external application is called using the request structure and a response is received therefrom.

In the present example, the change object instance contains a reference to a document version. If the document version has changed then the linked document should also be updated on the external application. The response output by process 430 includes additional attributes which are used by process 440 to call a maintain document version service of the external application. Process step adapter 435 maps the attributes of the response structure of the change object instance output by process 430 (which include a link to a document) to a request structure of a document version meta domain model object instance.

Figure 5:
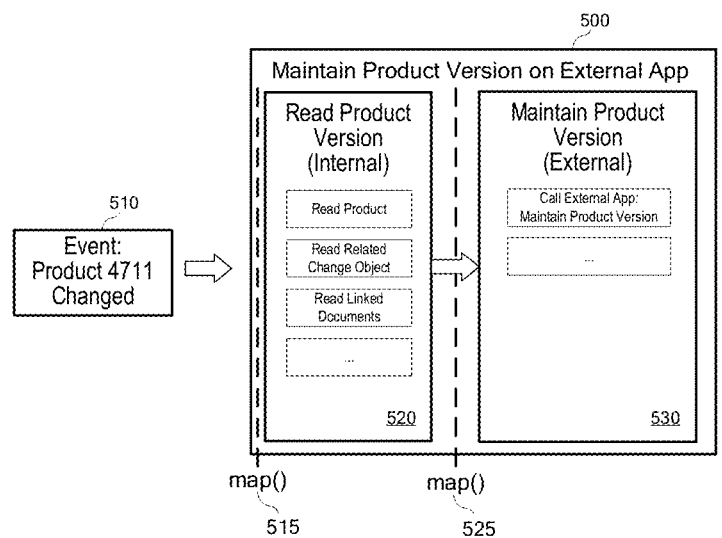
FIG. 5 is a block diagram illustrating an example process chain according to some embodiments.

FIG. 5 is an example of process chain 500 according to some embodiments. Process chain 500 is associated with a change to a product object instance. For example, the weight of a material master for product 4711 is changed and process chain 500 is intended to maintain a corresponding change version on an external application system.

Event 510 is raised by the internal application in response to the change to the product object instance. Process chain 500 is determined based on its association to the even type and object type as described above. A corresponding meta domain model object (e.g., a product version object) and its keys are determined based on a key of the internal application corresponding to the product object instance and on a key mapping table. The tasks of read product version process 420 are then executed to build the complete product version instance. These tasks include a read product task, a read related change object task, and a read related documents task to determine the related documents which are linked to the object. A response structure of the product version object is then output.

The response structure of the product version object is mapped to a request structure of the product version object by process step adapter 525. Maintain product version process 530 is executed to call the external application using the request structure of the product version object. The external application then updates its corresponding object instances per its internal processes.

Embodiments promote reusability of the processes and the process step adapters. For example, a request could be received from an external system to read a product version object instance on the internal system. In response, a process chain including process 520 could be executed to read the product version object instance, build a response including the read data, and return the response in the meta domain model format used by process 520.

Process 420 of process chain 400 could also be reused in a different process chain. For example, in response to an event indicating a change to a document, a process chain including process 420 could be executed to read the change object instance and build a meta domain model object response. The response is mapped to a request which is input to a maintain change object process to maintain the change on the internal system.

Figure 6:
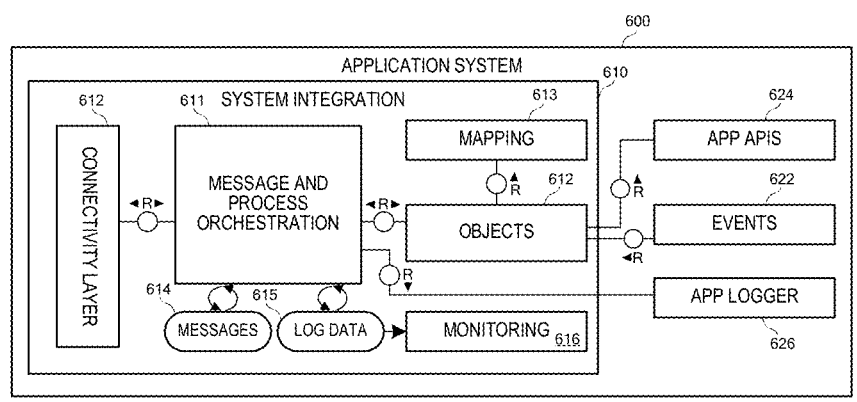
FIG. 6 is a block diagram of a system integration component according to some embodiments.

FIG. 6 is a block diagram of system 600 according to some embodiments. System 600 may comprise an implementation of application system 120 of FIG. 1 but embodiments are not limited thereto. Each component of system 600 may be implemented using executable program code.

Application system 600 includes system integration component 610 for providing the functionality described herein to applications (not shown) executed by application system 600. In particular, system integration component 610 includes message and process orchestration component (MPO) 611 which may execute process chains as described above. For example, connectivity layer 612 receives requests in meta domain model object format, MPO component 611 determines a process chain based on a type of the request and an object type, and executes the processes and process step adapters of the process chain.

Figure 7:
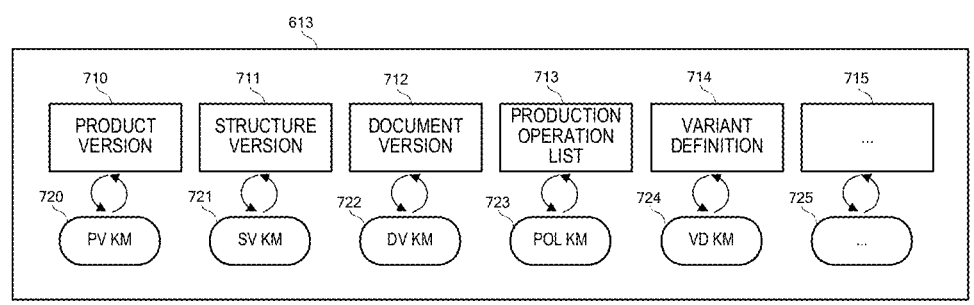
FIG. 7 is a block diagram of application object keys to meta domain model object keys according to some embodiments.

Execution of a process chain may include mapping between internal objects defined in object metadata 612 and meta domain model objects using mappings 613. FIG. 7 is a block diagram of mappings 613 which shows, for each meta domain model object 710 through 715, key mappings 720 through 725 which include map objects of the meta domain model to objects of application system 600. One meta domain model object may map to several application system objects, and one application system object may map to several meta domain model objects.

MPO component 611 receives events 622 raised by the application. In response, MPO component 611 determines a process chain based on a type and an object type of the event, and executes the processes and process step adapters of the process chain as described above. Execution of a process of a process chain may require calls to APIs 624 exposed by the application.

During operation, MPO component 611 may provide application-specific log information to application logger 626. MPO component 611 also writes to messages 614 and log data 615. Monitoring component 616 may access log data 615 to provide monitoring of system integration component 610.

Figure 8:
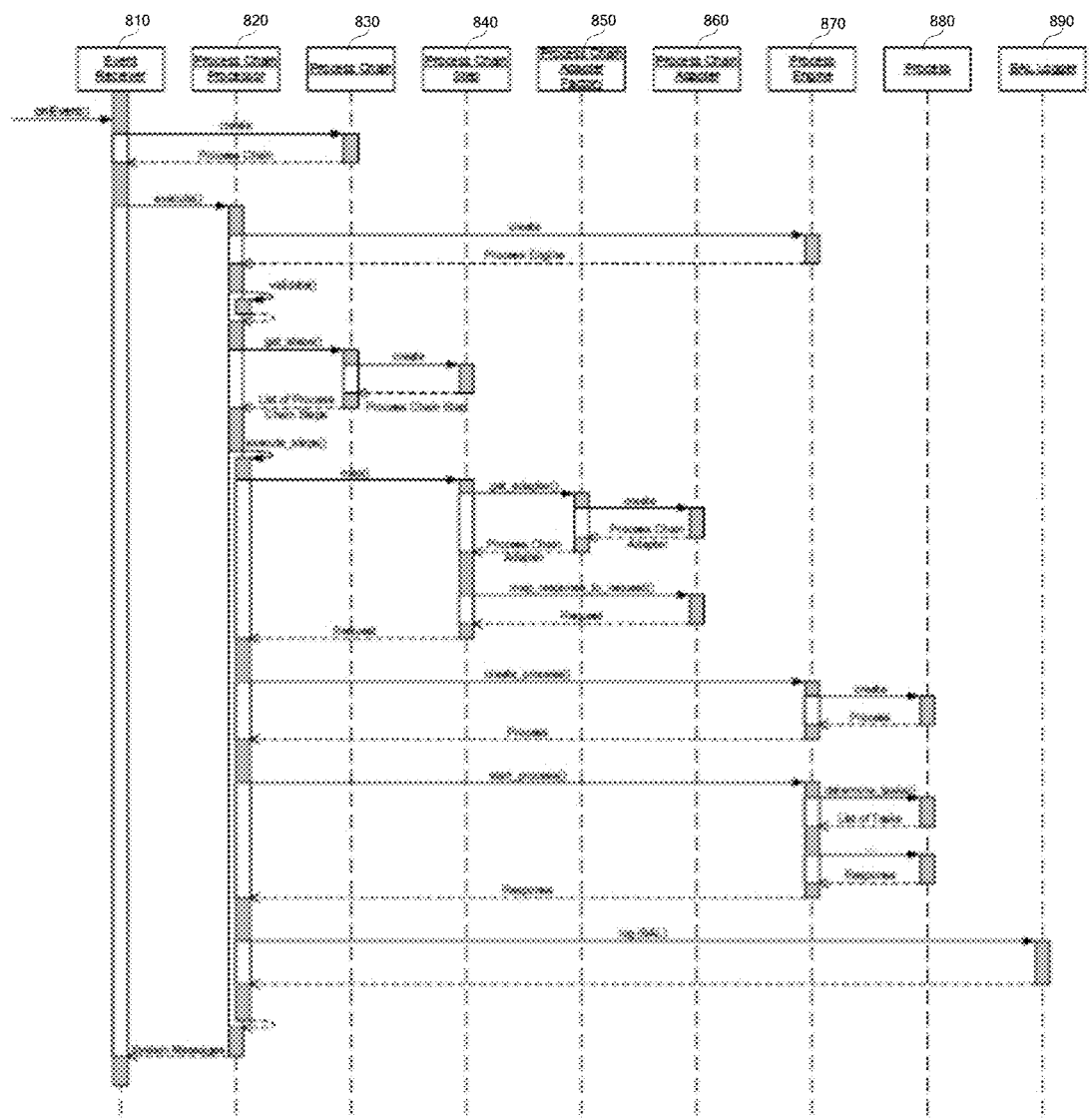
FIG. 8 is a sequence diagram illustrating execution of a process chain according to some embodiments.

FIG. 8 is a sequence diagram illustrating interoperation of various components to provide execution of process chains in response to events according to some embodiments. The actions described in FIG. 8 may be performed by executing corresponding program code of the respective component(s). All actions mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. Embodiments are not limited to any specific combination of hardware and software.

Event receiver 810 initially detects an event, which may comprise an internal event raised by an application executing on an application system which also executes a system integration component as described herein, or a call received from an external application. Event receiver 810 determines that the event is associated with a defined process chain and instantiates the process chain 830. Event receiver 810 then instructs process chain processor 820 to execute the process chain.

Process chain processor 820 instantiates process engine 870 and instructs process chain 830 to retrieve its constituent steps. Process chain 830 retrieves a list of its process chain steps, each of which includes a process and a process step adapter. Process chain processor 820 then proceeds to execute the process chain steps 840. Specifically, for each process chain step 840 of the process chain 830, process chain processor 820 requests the process chain step adapter 860 of the process chain step 840 from process chain adapter factory 850 and uses the process chain adapter 860 to map a prior response (if any) to a request.

Next, process chain processor 820 requests process engine 870 to create the process 880 of the process chain step 840. Upon creation of the process 880, process engine 870 determines a list of tasks corresponding to the process 880 and executes the tasks to generate a response. Process chain processor 820 receives the response, writes to logger 890, and returns system messages to event receiver 810.

Figure 9:
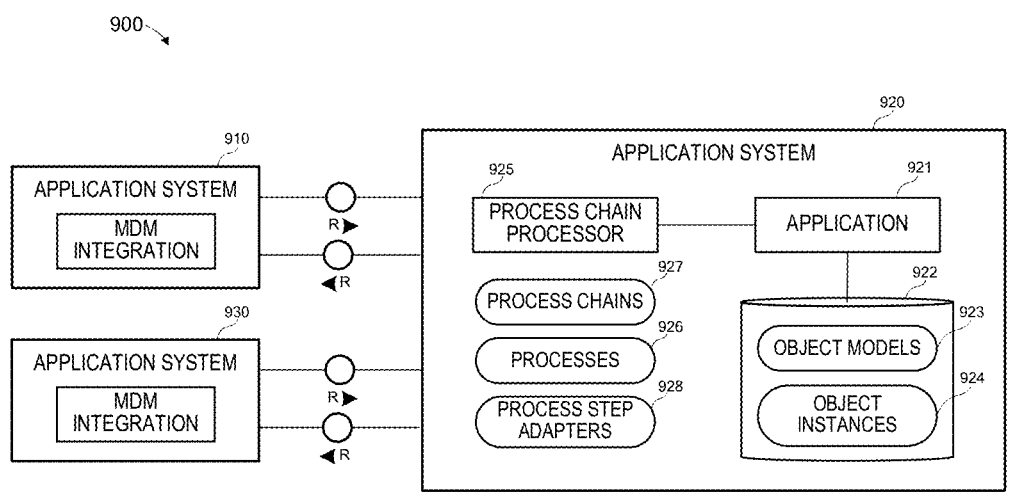
FIG. 9 is a block diagram of an architecture to facilitate chaining of intra and inter-application calls based on event triggers according to some embodiments.

FIG. 9 is a block diagram of architecture 900 according to some embodiments. Architecture 900 may comprise an implementation of architecture 100 but embodiments are not limited thereto. Unlike architecture 100, architecture 900 includes two external application systems 910, 930.

Each of application systems 910, 930 may operate based on respective sets of object definitions and may provide related functionality. Each of application systems 910, 930 includes a meta data model integration component to map its respective object instances to and from meta data model object instances. Accordingly, application systems 910, 930 may transmit calls to application system 920 based on meta data model objects to trigger execution of process chains therein, and may receive calls from application system 920 based on meta data model objects which result from execution of process chains.

Figure 10:
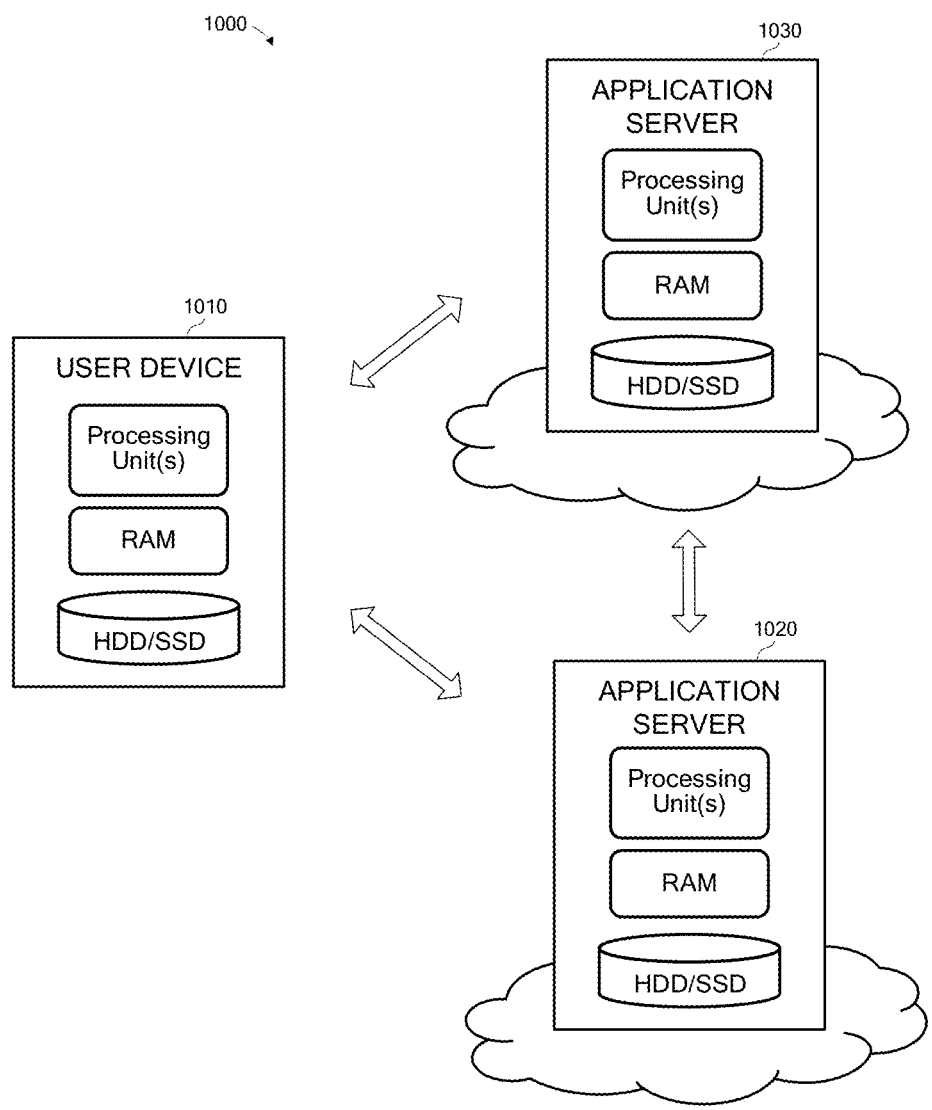
FIG. 10 is a block diagram of a cloud-based architecture providing chaining of intra and inter-application calls based on event triggers according to some embodiments.

FIG. 10 illustrates cloud-based database deployment 1000 according to some embodiments. In this regard, application servers 1020 and 1030 may comprise cloud-based compute resources, such as virtual machines, allocated by a public cloud provider providing self-service and immediate provisioning, autoscaling, security, compliance and identity management features.

User device 1010 may issue a request an application executing on application server 1020, for example via a Web Browser executing on user device 1010. The request may be routed to application server 1020 according to Internet protocols. During execution of the application, a system integration component as described herein may determine to execute a process chain based on a detected event. Execution of the process chain may result in issuance of an external call from application server 1020 to application server 1030 as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architecture 100 or 900 may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method comprising:
   receiving an indication of a first event associated with a first object instance; and
   in response to the indication of the first event:
   determining a first process chain associated with the first event, the first process chain comprising a first process associated with an object instance of a first meta domain model object type, a second process associated with an object instance of a second meta domain model object type, and a first process step adapter to map a response associated with an object instance of the first meta domain model object type to a request associated with an object instance of the second meta domain model object type;
   executing the first process based on a request associated with an object instance of the first meta domain model object type to generate a first response associated with an object instance of the first meta domain model object type;
   executing the first process step adapter to map the first response associated with an object instance of the first meta domain model object type to a first request associated with an object instance of the second meta domain model object type; and
   executing the second process based on the first request associated with an object instance of the second meta domain model object type to generate a second response associated with an object instance of the second meta domain model object type.

2. A method according to claim 1, wherein the first process chain comprises a third process associated with an object instance of a third meta domain model object type and a second process step adapter to map a response associated with an object instance of the second meta domain model object type to a request associated with an object instance of the third meta domain model object type, the method further comprising:
   executing the second process step adapter to map the second response associated with an object instance of the second meta domain model object type to a second request associated with an object instance of the third meta domain model object type; and
   executing the third process based on the second request associated with an object instance of the third meta domain model object type to generate a third response associated with an object instance of the third meta domain model object type.

3. A method according to claim 1, wherein executing the second process comprises executing a call to an external application based on the second meta domain model object type.

4. A method according to claim 1, wherein executing the second process comprises updating an internal object instance based on the second meta domain model object type.

5. A method according to claim 1, wherein the first event comprises an update to the first object instance.

6. A method according to claim 1, wherein the first event comprises receipt of a call from an external application associated with the first meta data model object type.

7. A method according to claim 1, further comprising:
   receiving a second indication of a second event associated with a second object instance; and
   in response to the indication of the second event:
   determining a second process chain associated with the second event, the first process chain comprising the first process associated with an object instance of a first meta domain model object type, a third process associated with an object instance of a third meta domain model object type, and a second process step adapter to map a response associated with an object instance of the first meta domain model object type to a request associated with an object instance of the third meta domain model object type;
   executing the first process based on a second request associated with an object instance of the first meta domain model object type to generate a third response associated with an object instance of the first meta domain model object type;
   executing the second process step adapter to map the third response associated with an object instance of the first meta domain model object type to a third request associated with an object instance of the third meta domain model object type; and
   executing the third process based on the third request associated with an object instance of the third meta domain model object type to generate a fourth response associated with an object instance of the third meta domain model object type.

8. A non-transitory computer-readable medium storing program code executable by one or more processing units to cause a computing system to:
   receive an indication of a first event associated with a first object instance; and
   in response to the indication of the first event:
   determine a first process chain associated with the first event, the first process chain comprising a first process associated with an object instance of a first meta domain model object type, a second process associated with an object instance of a second meta domain model object type, and a first process step adapter to map a response associated with an object instance of the first meta domain model object type to a request associated with an object instance of the second meta domain model object type;
   execute the first process based on a request associated with an object instance of the first meta domain model object type to generate a first response associated with an object instance of the first meta domain model object type;
   execute the first process step adapter to map the first response associated with an object instance of the first meta domain model object type to a first request associated with an object instance of the second meta domain model object type; and
   execute the second process based on the first request associated with an object instance of the second meta domain model object type to generate a second response associated with an object instance of the second meta domain model object type.

9. A medium according to claim 8, wherein the first process chain comprises a third process associated with an object instance of a third meta domain model object type and a second process step adapter to map a response associated with an object instance of the second meta domain model object type to a request associated with an object instance of the third meta domain model object type, the program code executable by one or more processing units to cause a computing system to:
   execute the second process step adapter to map the second response associated with an object instance of the second meta domain model object type to a second request associated with an object instance of the third meta domain model object type; and execute the third process based on the second request associated with an object instance of the third meta domain model object type to generate a third response associated with an object instance of the third meta domain model object type.

10. A medium according to claim 8, wherein executing the second process comprises executing a call to an external application based on the second meta domain model object type.

11. A medium according to claim 8, wherein executing the second process comprises updating an internal object instance based on the second meta domain model object type.

12. A medium according to claim 8, wherein the first event comprises an update to the first object instance.

13. A medium according to claim 8, wherein the first event comprises receipt of a call from an external application associated with the first meta data model object type.

14. A medium according to claim 8, the program code executable by one or more processing units to cause a computing system to:

receive a second indication of a second event associated with a second object instance; and in response to the indication of the second event:

determine a second process chain associated with the second event, the first process chain comprising the first process associated with an object instance of a first meta domain model object type, a third process associated with an object instance of a third meta domain model object type, and a second process step adapter to map a response associated with an object instance of the first meta domain model object type to a request associated with an object instance of the third meta domain model object type;

execute the first process based on a second request associated with an object instance of the first meta domain model object type to generate a third response associated with an object instance of the first meta domain model object type;

execute the second process step adapter to map the third response associated with an object instance of the first meta domain model object type to a third request associated with an object instance of the third meta domain model object type; and execute the third process based on the third request associated with an object instance of the third meta domain model object type to generate a fourth response associated with an object instance of the third meta domain model object type.

15. A system comprising:

one or more storage devices storing:

executable program code of two or more processes, each of the two or more processes associated with a meta domain model object type;

executable program code of two or more process step adapters, each of the two or more process step adapters to map a response associated with an object instance of a meta domain model object type to a request associated with an object instance of a meta domain model object type; and process chain metadata defining two or more process chains, each of the two or more process chains comprising one or more of the two or more processes and one or more of the two or more process step adapters; and mapping metadata associating each of one or more events with one of the two or more process chains;

one or more processing units; and a memory storing program code executable by the one or more processing units to cause the system to:

receive an indication of a first event associated with a first object instance; and in response to the indication of the first event:

determine, based on the mapping metadata, a first process chain of the two or more process chains associated with the first event, the first process chain comprising a first process associated with an object instance of a first meta domain model object type, a second process associated with an object instance of a second meta domain model object type, and a first process step adapter to map a response associated with an object instance of the first meta domain model object type to a request associated with an object instance of the second meta domain model object type;

execute program code of the first process based on a request associated with an object instance of the first meta domain model object type to generate a first response associated with an object instance of the first meta domain model object type;

execute program code of the first process step adapter to map the first response associated with an object instance of the first meta domain model object type to a first request associated with an object instance of the second meta domain model object type; and execute program code of the second process based on the first request associated with an object instance of the second meta domain model object type to generate a second response associated with an object instance of the second meta domain model object type.

16. A system according to claim 15, wherein the first process chain comprises a third process associated with an object instance of a third meta domain model object type and a second process step adapter to map a response associated with an object instance of the second meta domain model object type to a request associated with an object instance of the third meta domain model object type, the program code executable by one or more processing units to cause a computing system to:

execute program code of the second process step adapter to map the second response associated with an object instance of the second meta domain model object type to a second request associated with an object instance of the third meta domain model object type; and execute program code of the third process based on the second request associated with an object instance of the third meta domain model object type to generate a third response associated with an object instance of the third meta domain model object type.

17. A system according to claim 15, wherein executing the second process comprises executing a call to an external application based on the second meta domain model object type.

18. A system according to claim 15, wherein executing the second process comprises updating an internal object instance based on the second meta domain model object type.

19. A system according to claim 15, wherein the first event comprises an update to the first object instance or receipt of a call from an external application associated with the first meta data model object type.

20. A system according to claim 15, the program code executable by one or more processing units to cause a computing system to:
- receive a second indication of a second event associated with a second object instance; and
- in response to the indication of the second event:
- determine, based on the mapping metadata, a second process chain associated with the second event, the first process chain comprising the first process associated with an object instance of a first meta domain model object type, a third process associated with an object instance of a third meta domain model object type, and a second process step adapter to map a response associated with an object instance of the first meta domain model object type to a request associated with an object instance of the third meta domain model object type;
- execute the program code of the first process based on a second request associated with an object instance of the first meta domain model object type to generate a third response associated with an object instance of the first meta domain model object type;
- execute program code of the second process step adapter to map the third response associated with an object instance of the first meta domain model object type to a third request associated with an object instance of the third meta domain model object type; and
- execute program code of the third process based on the third request associated with an object instance of the third meta domain model object type to generate a fourth response associated with an object instance of the third meta domain model object type.

* * * * *